United States Patent [19]

Jesswein

[11] 4,075,840
[45] Feb. 28, 1978

[54] BRAKE AND STEERING SYSTEM

[75] Inventor: Ronald M. Jesswein, Berrien Springs, Mich.

[73] Assignee: Clark Equipment Company, Buchanan, Mich.

[21] Appl. No.: 729,927

[22] Filed: Oct. 6, 1976

[51] Int. Cl.² .......................................... F15B 13/06
[52] U.S. Cl. ................................. 60/422; 60/484; 60/582; 137/101
[58] Field of Search ............... 60/386, 403, 422, 484, 60/582; 91/412; 137/101

[56] References Cited

U.S. PATENT DOCUMENTS

| Re. 24,892 | 10/1960 | Banker | 137/101 |
|---|---|---|---|
| 2,737,196 | 3/1956 | Eames | 137/101 |
| 2,910,085 | 10/1959 | Banker | 137/101 |
| 3,411,293 | 11/1968 | Akins | 60/454 |
| 3,568,868 | 3/1971 | Chichester | 137/101 X |
| 3,841,095 | 10/1974 | Baker | 60/404 |

OTHER PUBLICATIONS

Waterman Hydraulics Pressure Compensated Priority Type Fixed Flow Control Valve With Secondary Flow (Specification, 2 Shts.).
Wagner Lockheed Hydraulic Power Master Cylinder (Descriptive Sheets, 2 pages).

*Primary Examiner*—Edgar W. Geoghegan
*Attorney, Agent, or Firm*—Kenneth C. Witt

[57] ABSTRACT

A combined brake and steering system for a vehicle having hydraulic braking and hydraulic steering. A single pump is utilized to supply both the brakes and steering. Two priority valves are arranged to assure that the brakes take precedence and receive an approximately constant flow of hydraulic fluid subject to a maximum pressure. The steering mechanism also normally receives a constant flow, subject to a maximum pressure which usually is different from the other maximum pressure.

7 Claims, 2 Drawing Figures

BRAKE AND STEERING SYSTEM

BACKGROUND OF THE INVENTION

1. Field of the Invention:

This invention relates to combined brake and steering hydraulic systems for vehicles having hydraulic brakes and hydraulic steering, and is particularly advantageous for articulated vehicles which require a relatively large flow of hydraulic fluid in the operation of the steering mechanism.

2. Description of the Prior Art:

Articulated vehicles, as referred to herein, comprise two separate frame portions, with the two frame portions connected by a combined draft and steering coupling. In order to steer such a vehicle it is necessary to turn one frame portion with respect to the other and this is commonly done by means of hydraulic actuators or jacks connected between the two frame portions.

Various kinds of brakes have been used for such vehicles, including pneumatic, combined pneumatic and hydraulic, full hydraulic and others. It is advantageous for many such vehicles to utilize hydraulic brakes and to employ a combined hydraulic steering and braking system.

In larger articulated vehicles it is common to utilize separate pumps to supply the steering system and the braking system, and it is known also to utilize three pumps, with the third pump arranged to be shifted between the steering and braking systems under various operating conditions.

For smaller articulated vehicles particularly it is advantageous to be able to utilize a single hydraulic pump to supply both the braking and steering systems, and the object of the present invention is to provide an improved system of this type.

SUMMARY OF THE INVENTION

In carrying out this invention in one preferred form, an open center type combined brake and steering hydraulic system for a vehicle is provided which includes a hydraulic pump on the vehicle arranged to supply at least a minimum flow of fluid to maintain adequate steering and braking whenever the vehicle is in normal operation. A first priority valve has its inlet connected to receive the entire output of the pump. The first priority valve has two outlets. The first of these outlets, during operation, discharges an approximately constant flow of fluid for operating the hydraulic brakes on the vehicle. The fluid from the second outlet of the first priority valve enters a second priority valve. One outlet from the second priority valve supplied the hydraulic steering valve of the vehicle a normally constant flow, while the other outlet from the second priority valve discharges the remainder of the fluid emanating from the pump. The pressure at the first or constant flow outlet of the first priority valve is limited to a predetermined maximum amount, while the pressure at the constant flow outlet of the second priority valve is limited to a predetermined maximum amount which usually is different from the other predetermined maximum amount.

BRIEF DESCRIPTION OF THE DRAWING

FIG. 1 of the drawing is a schematic diagram of a system incorporating a preferred embodiment of this invention, while

DESCRIPTION OF THE PREFERRED EMBODIMENTS

Figure 1:
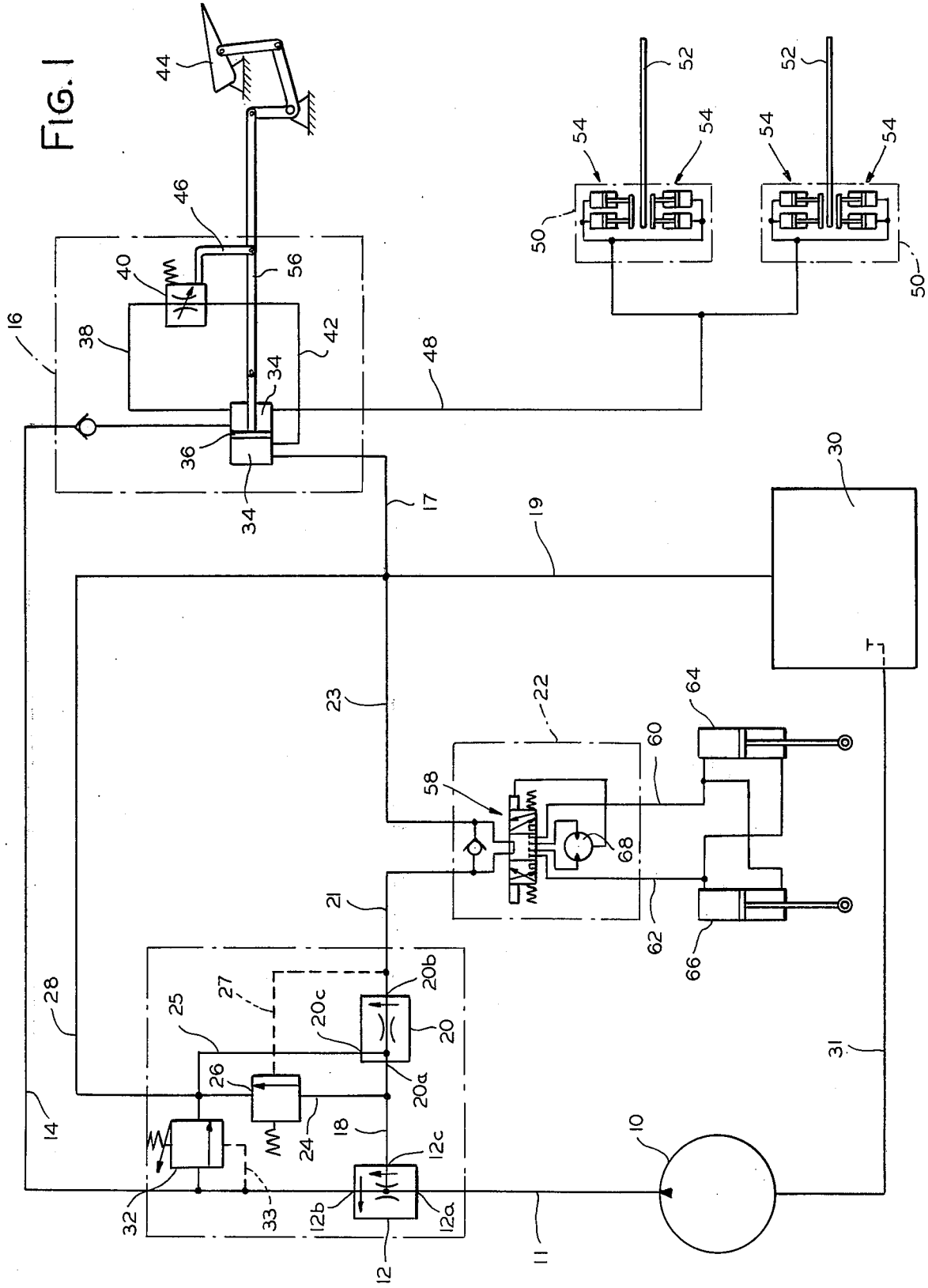

In FIG. 1 of the drawing, the numeral 10 indicates a constant displacement pump which supplies the combined brake and steering system of this invention. The pump 10 may be operated by the engine of the vehicle in which the present system is embodied and may operate over a range of speeds varying from the engine idling condition to the maximum engine speed condition.

The entire output of the pump 10 is discharged through a conduit 11 and into the inlet 12a of a priority valve 12 of known type. Priority valve 12 has two outlets, a regulated flow outlet indicated at 12b and a by-pass flow outlet indicated at 12c. The priority valve 12 is of the pressure compensated type and the flow from outlet 12b has priority. That is, in a system as shown and under normal operating conditions the fluid flow from outlet 12b is maintained at an approximately constant rate regardless of the pressure or lack of pressure at outlet 12b and regardless of the pressure and/or flow from outlet 12c.

As an example, in a typical vehicle, the flow from outlet 12b may be approximately 2.5 gallons per minute from a pump 10, the output of which may vary from 8 gallons per minute at 700 rpm, the engine idling speed, to 28 gallons maximum per minute at 2300 rpm, the governed speed. The normal operating range for the engine of such vehicle is considered to be between approximately 700 rpm (at which the flow is approximately 8 gpm) and 2300 rpm (at which the flow is approximately 28 gpm).

The flow from outlet 12b passes through a conduit 14 to and through an open center brake operating mechanism of known type indicated generally by the numeral 16, and leaves brake operating mechanism 16 through conduit 17 and then flows through conduit 19 to the reservoir 30. From the reservoir 30 hydraulic fluid recirculates through conduit 31 to the inlet of pump 10.

From the by-pass outlet 12c of the priority valve 12 hydraulic fluid flows through a conduit 18 into the inlet 20a of a second priority valve 20. Priority valve 20 has a regulated flow outlet 20b which, under some operating conditions, discharges an approximately constant flow of fluid into conduit 21 whence it flows through a steering mechanism 22 and conduits 23 and 19 back to the reservoir 30. When the engine is idling the flow from regulated outlet 20b may be less than the constant amount as explained hereinafter.

The remainder of the fluid entering priority valve 20 is discharged from the second outlet or by-pass 20c through conduit 25 which connects with a conduit 28 and thereby returns such fluid through the conduit 19 to the reservoir 30.

The discharge from the regulated outlet 20b of the priority valve 20 may be, for example, approximately 12 gallons per minute. This means that when the engine is in the normal opeating range, as defined herein, the discharge through by-pass outlet 20c and conduit 25 will vary from a minimum amount of 0 gpm up to 13.5 gpm. With the engine idling at 700 rpm, the flow from the priority valve 20 through steering valve 22 will be about 5.5 gallons per minute. Whenever the speed of the engine and pump results in a flow of less than 12 gpm through the steering mechanism 22 the speed of steering is correspondingly less, but adequate for the conditions.

Although the brake mechanism as such is not a part of the present invention a brief explanation of its operation will facilitate an understanding of the present invention. When the pump 10 is in operation and no braking is taking place the constant flow of fluid through outlet 12b and conduit 14 enters the chamber 34 to the right of piston 36 and then flows through conduit 38 and adjustable valve 40 and through a conduit 42 into the left end of chamber 34, and then to conduit 17 and 19 and on to the reservoir 30.

The opertion of the foot pedal 44 by the operator, through linkage 46 closes valve 40 an amount depending upon the amount pedal 44 is depressed and applies the brakes a corresponding amount by directing hydraulic fluid under pressure through conduit 48 to disc brakes indicated generally at 50. Each of the two brakes shown comprises a rotor indicated at 52 plus discs and hydraulic actuators on both sides of each rotor indicated generally at 54.

The brake mechanism 16 has an emergency feature whereby if there should be a failure in hydraulic pump 10 or conduit 14, for example, and consequent loss of incoming fluid, the movement of the pedal 44, through link 56, moves piston 36 to the right to trap fluid in the right end of chamber 34 and through continued movement of pedal 44 applies pressure to the brakes 50 through conduit 48.

The steering mechanism 22 likewise is of known type but it is believed an explanation of its operation also will facilitate an understanding of the operation of the present invention. Movement of the operator's steering wheel on the vehicle moves a valve spool indicated at 58 either to the right or left depending upon the desired direction of steering. This causes the flow of fluid under pressure through either conduit 60 or 62 to a pair of hydraulic actuators or jacks indicated generally at 64 and 66. These are connected in push-pull relation so that the flow of pressurized fluid through conduit 60, for example, extends actuator 64 and simultaneously contracts actuator 66, with conduit 62 serving as the return conduit. Conversely, the flow of pressurized fluid through conduit 62 extends actuator 66 and contracts actuator 64, and conduit 60 serves as the return conduit. Such operation of the actuators pivots one frame portion of the vehicle with respect to the other in the desired direction and accordingly produces steering in the selected direction.

As shown, the steering mechanism 22 also includes an emergency manually operated pump 68 which is arranged to operate the steering actuators 64 and 66 in the event of failure of the pump 10 or any of the elements in the hydraulic circuit between the pump and steering mechanism 22.

A relief valve 32 is connected between conduits 14 and conduit 28 for a purpose to be explained, and a similar relief valve 26 is connected by conduit 24 between conduit 18 and conduit 28.

In the operation of the system of FIG. 1 whenever the pump 10 is in operation, whether the engine is idling or running at a greater operating speed, the specified constant flow of hydraulic fluid flows from outlet 12b of priority valve 12 through conduit 14 and through brake mechanism 16 and back to the reservoir. When the operator applies the brakes by operating pedal 44 the amount of application of the brakes depends upon the amount of operation of the pedal and consequently upon the amount of closing of valve 40. Thus, a varying pressure, dependent upon the operator, is applied to the brakes, up to a maximum pressure which is determined by relief valve 32, and this may, for example, be set at 2000 pounds per square inch. A pressure sensing connection for operating the relief valve 32 responsively to the pressure in conduit 14 and at outlet 12b is indicated at 33.

All of the flow from the pump 10 enters priority valve 12 and except for the relatively small regulated amount which is discharged through outlet 12b, is discharged from priority valve 12 through by-pass outlet 12c. Thence, under normal operating conditions the flow from outlet 12c enters the inlet 20a of priority valve 20. In the example given of a typical vehicle embodying the present invention a regulated amount of approximately 12 gallons per minute (or less under some circumstances) is discharged through regulated outlet 20b while the remainder of the fluid (if any) from the pump 10 is discharged from by-pass port 20c and returns to the reservoir.

The pressure which is available for operation of the steering mechanism is determined by the relief valve 26, and this may be set, for example, at 1600 psi. As shown, the pressure sensing connection 27 for the relief valve is connected to reflect the pressure at regulated outlet 20b.

In operation, if neither the brake mechanism nor the steering mechanism is in operation, the flow from pump 10 passes through both such mechanisms with little resistance, at a negligible pressure drop, and consequently little energy is required to operate pump 10 under such circumstances as is typical for an open center system.

When steering occurs, the pump 10 then must operate against a pressure which may reach a maximum of 1600 psi and this, of course, requires considerably more energy. It will be appreciated that the actual pressure reached in the steering portion of the system is dependent upon the conditions under which steering takes place.

When braking occurs the pressure in the braking portion of the system may rise to 2000 psi and such pressure is reflected back to the priority valve 12 and the pump 10 and the energy required to pump all of the fluid handled by the pump increases accordingly. In a typical situation the pressure drop between inlet 12a and regulated flow outlet 12b is 70 psi; thus, when the pressure at 12b is 2000 psi the pressure at inlet 12a and at the pump 10 is 2070 psi.

It will be appreciated that the system of FIG. 1 makes possible reduced energy consumption because except for intervals involving braking during which the pressure in the braking portion of the system exceeds 1600 psi the pump 10 is required to operate at a maximum pressure of 1600 psi, such condition occurring during operation of the steering mechanism. Nevertheless, the maximum pressure of 2000 psi is available for the braking mechanism when needed.

Figure 2:
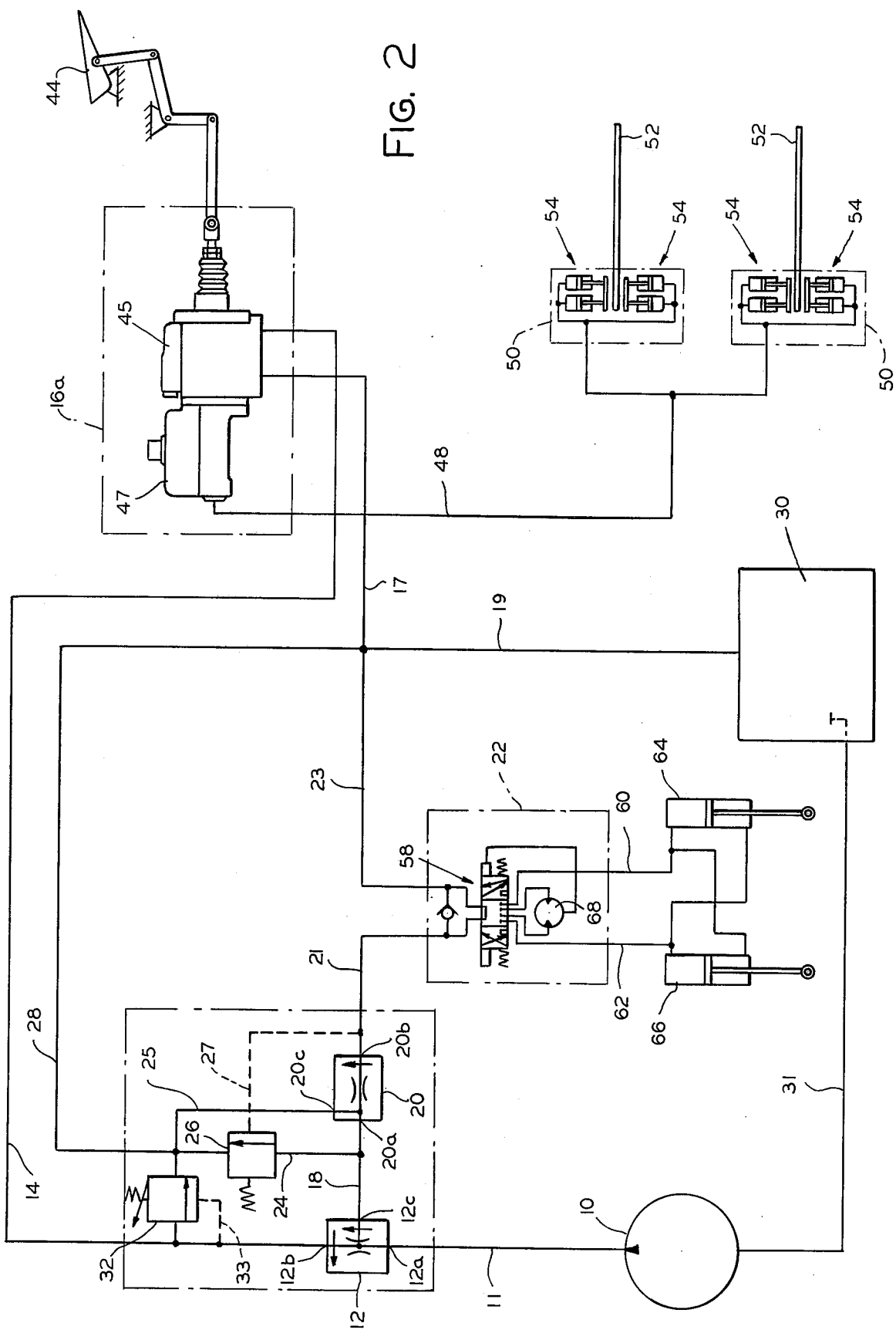
FIG. 2 is a schematic diagram of a system incorporating a second preferred embodiment of this invention.

The system of FIG. 2 is the same as FIG. 1 except for the brake operating mechanism and the resultant effect on the maximum pressure at the outlet 12b of priority valve 12. In FIG. 2 the brake operating mechanism designated 16a, comprises a known type of power assist or pressure multiplier device indicated at 45 which is connected to and operates a so-called master cylinder indicated at 47.

The device 45 is of the open center of flow through type which accommodates the normally constant flow from outlet 12b of priority valve 12 which enters device 45 through conduit 14 and is directed back to the reservoir through conduit 17. The operation of the operator's foot pedal 44 in FIG. 2 closes a restriction in device 45 which causes it to in effect multiply the available pressure and operate master cylinder 47 to apply the brakes 50. There is fluid in a reservoir portion of device 47 and this fluid plus fluid in conduit 48 and in the brakes 50 forms a closed subsystem separate from the fluid in the remainder of the combined brake and steering system. The presence of such separate closed sub-system does not, however, change the character of the main system including device 45 as an open center system.

In the system of FIG. 2 the maximum pressure available for braking may be 2000 psi as in FIG. 1. However, because of the pressure multiplication effect of device 45 the maximum pressure reflected back to outlet 12b of priority valve 12 may be only 1/7th of that pressure or 285 psi in a typical case. Thus, in FIG. 2 the relief valve 32 would be set at 285 psi. It will be appreciated that relief valve 32 may be incorporated physically in device 45 if desired.

Where reference is made in the claims to different predetermined maximum pressures for the brake mechanism and the hydraulic steering mechanism respectively it will be appreciated that these maximums are usually different as in either FIG. 1 or FIG. 2 although it is within the scope of the present invention to have the two predetermined maximums the same.

Thus while I have described and illustrated herein the best modes contemplated for carrying out my invention it will be appreciated that modifications may be made. Accordingly, it should be understood that I intend to cover by the appended claims all such modifications which fall within the true spirit and scope of my invention.

I claim:

1. A combined brake and steering hydraulic system for a vehicle, comprising a hydraulic pump on the vehicle having an output of a predetermined maximum amount of fluid in a normal operating range, a first priority valve having a first inlet and a first regulated outlet and a first by-pass outlet, the said first inlet connected to receive the entire output of the said pump, the said first regulated outlet during normal operation discharging an approximately constant flow of fluid, an open center hydraulic brake mechanism on the vehicle, first conduit means directing fluid from the said first regulated flow outlet to the said brake mechanism, a second priority valve having a second inlet and a second regulated outlet and a second by-pass outlet, second conduit means directing the flow from the said first by-pass outlet to the said second inlet, an open center hydraulic steering mechanism on the vehicle, the said second regulted outlet discharging fluid during some conditions of operation at a second approximately constant flow, means directing the flow from the said second regulated outlet to the said steering mechanism, the total of the said first and second constant flows being less than the said predetermined maximum amount, and the said second by-pass outlet discharging the remainder of the fluid output of the said pump.

2. A system as in claim 1 in which the said hydraulic steering mechanism operates at a lower hydraulic pressure than the maximum hydraulic operating pressure of the said brake mechanism.

3. A system as in claim 1 in which the said hydraulic steering mechanism operates at a higher hydraulic pressure than the maximum hydraulic pressure produced in the system by the operation of the said brake mechanism.

4. A system as in claim 1 in which a first relif valve is connected to limit the pressure at the said first regulated outlet to a predetermined pressure and a second relief valve is connected to limit the pressure at the said second regulated outlet to an amount lower than the said predetermined pressure.

5. A system as in claim 1 including a reservoir and in which fluid discharged from said hydraulic brake mechanism, together with the fluid discharged from said hydraulic steering mechanism and the reminder of the fluid output of said pump, all are discharged into said reservoir.

6. A system as in claim 4 including conduit means connecting said reservoir and the inlet of said hydraulic pump to provide for fluid circulation in a closed system.

7. A system as in claim 1 in which said pump has an idle condition in which the fluid output of said pump is less than said predetermined maximum amount, and in which the total of said first and second constant flows is less than said predetermined maximum amount, the said first constant flow being maintained during said idle condition while said second regulated outlet discharges less than said second constant flow to said hydraulic steering mechanism.

* * * * *